United States Patent
Christen et al.

(10) Patent No.: US 9,499,153 B2
(45) Date of Patent: Nov. 22, 2016

(54) METHOD FOR CHANGING FROM A COASTING OR FREE-ROLLING MODE OF A MOTOR VEHICLE TO A FUEL CUT-OFF MODE

(71) Applicant: Ford Global Technologies, LLC, Dearborn, MI (US)

(72) Inventors: Urs Christen, Aachen (DE); Ian Oldknow, St. Albans (GB); Erik Alpman, Aachen (DE); Rainer Busch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 14/373,842

(22) PCT Filed: Apr. 11, 2013

(86) PCT No.: PCT/EP2013/057568
§ 371 (c)(1),
(2) Date: Jul. 22, 2014

(87) PCT Pub. No.: WO2013/156381
PCT Pub. Date: Oct. 24, 2013

(65) Prior Publication Data
US 2015/0046050 A1     Feb. 12, 2015

(30) Foreign Application Priority Data
Apr. 16, 2012 (DE) .................. 10 2012 206 135

(51) Int. Cl.
| | |
|---|---|
| B60W 10/02 | (2006.01) |
| B60W 10/06 | (2006.01) |
| B60W 30/18 | (2012.01) |

(52) U.S. Cl.
CPC .............. *B60W 10/02* (2013.01); *B60W 10/06* (2013.01); *B60W 30/18* (2013.01);
(Continued)

(58) Field of Classification Search
None
See application file for complete search history.

(56) References Cited

U.S. PATENT DOCUMENTS

| | | | |
|---|---|---|---|
| 4,422,353 A | 12/1983 | Suga et al. | |
| 4,509,628 A | 4/1985 | Junginger et al. | |

(Continued)

FOREIGN PATENT DOCUMENTS

| | | |
|---|---|---|
| DE | 4213589 A1 | 11/1992 |
| DE | 4419633 A1 | 12/1994 |

(Continued)

OTHER PUBLICATIONS

Mueller, N. et al., "Next Generation Engine Start/Stop Systems: "Free-Wheeling"," SAE Technical Paper Series No. 2011-01-0712, published Apr. 12, 2011, 14 pages.

(Continued)

*Primary Examiner* — Edwin A Young
(74) *Attorney, Agent, or Firm* — Julia Voutyras; Alleman Hall McCoy Russell & Tuttle LLP

(57) ABSTRACT

The invention relates to a method and device for changing from a coasting or free-rolling mode of a motor vehicle with an internal combustion engine and an automatic clutch, which is disengaged during the coasting or free-rolling mode, to a fuel cut-off mode, in which the clutch is engaged, wherein before engagement of the clutch the internal combustion engine is brought to a revolution rate at which the engagement of the clutch induces no or only small changes in revolution rate in the drive train, and whereby the fuel supply to the internal combustion engine is reduced following engagement of the clutch. Under one or more predetermined conditions the increase of the drag torque of the internal combustion engine acting on the motor vehicle during the changeover from coasting or free-rolling mode to fuel cut-off mode takes place so slowly that the change is not usually noticed by the driver.

20 Claims, 1 Drawing Sheet

(52) U.S. Cl.
CPC *B60W 30/18072* (2013.01); *B60W 30/18136* (2013.01); *B60W 2030/1809* (2013.01); *B60W 2510/1005* (2013.01); *B60W 2510/182* (2013.01); *B60W 2540/12* (2013.01); *B60W 2550/142* (2013.01); *B60W 2710/023* (2013.01); *B60W 2710/0627* (2013.01)

(56) References Cited

U.S. PATENT DOCUMENTS

| | | | |
|---|---|---|---|
| 4,842,113 | A | 6/1989 | Lutz |
| 5,520,594 | A * | 5/1996 | Fukasawa ......... B60W 30/1819 477/166 |
| 5,670,831 | A | 9/1997 | Georgiades |
| 5,942,988 | A | 8/1999 | Snyder et al. |
| 6,307,277 | B1 | 10/2001 | Tamai et al. |
| 6,376,927 | B1 | 4/2002 | Tamai et al. |
| 6,686,670 | B1 | 2/2004 | Weigl et al. |
| 6,832,151 | B2 | 12/2004 | Kumazaki et al. |
| 7,043,354 | B2 | 5/2006 | Braun et al. |
| 7,078,828 | B2 | 7/2006 | Suzuki |
| RE40,164 | E | 3/2008 | Kuang et al. |
| 7,657,366 | B2 | 2/2010 | Guy et al. |
| 8,095,291 | B2 | 1/2012 | Christen et al. |
| 8,521,379 | B2 | 8/2013 | Wurthner et al. |
| 8,784,266 | B2 | 7/2014 | Christen et al. |
| 8,784,267 | B2 | 7/2014 | Staudinger et al. |
| 2004/0138027 | A1* | 7/2004 | Rustige ................ B60W 10/02 477/175 |
| 2007/0267238 | A1 | 11/2007 | Guy et al. |
| 2008/0176708 | A1 | 7/2008 | Tamai et al. |
| 2012/0220422 | A1* | 8/2012 | Wurthner ............ B60W 10/02 477/79 |
| 2013/0116903 | A1 | 5/2013 | Lenz et al. |

FOREIGN PATENT DOCUMENTS

| | | |
|---|---|---|
| DE | 10211463 B3 | 1/2002 |
| DE | 10221701 A1 | 11/2002 |
| DE | 10349445 A1 | 5/2004 |
| DE | 102008013401 A1 | 9/2009 |
| DE | 102008013409 A1 | 9/2009 |
| DE | 102008013410 A1 | 9/2009 |
| DE | 102008013411 A1 | 9/2009 |
| DE | 102009002952 A1 | 2/2011 |
| DE | 102009029365 A1 | 3/2011 |
| EP | 1059441 A2 | 12/2000 |
| EP | 1063424 A1 | 12/2000 |
| EP | 1416142 A1 | 5/2004 |
| EP | 1541864 A2 | 6/2005 |
| EP | 1944529 A2 | 7/2008 |
| EP | 2327901 A1 | 6/2011 |
| EP | 2383461 A2 | 11/2011 |
| GB | 2484803 A | 4/2012 |
| JP | 2004048466 A | 2/2004 |
| WO | 0034693 A1 | 6/2000 |
| WO | 02063163 A1 | 8/2002 |
| WO | 03049969 A2 | 6/2003 |
| WO | 2004024490 A | 3/2004 |
| WO | 2005084995 A1 | 9/2005 |
| WO | 2008122368 A1 | 10/2008 |
| WO | 2009152966 A2 | 12/2009 |

OTHER PUBLICATIONS

ISA European Patent Office, Search Report of PCT/EP2013/057568, Jul. 29, 2013, WIPO, 3 pages.

* cited by examiner

METHOD FOR CHANGING FROM A COASTING OR FREE-ROLLING MODE OF A MOTOR VEHICLE TO A FUEL CUT-OFF MODE

CROSS REFERENCE TO RELATED APPLICATIONS

The present application is a U.S. National Phase application of PCT/EP2013/057568, filed on Apr. 11, 2013, which claims priority to German Patent Application 102012206135.5, filed on Apr. 16, 2012, the entire contents of each of which are hereby incorporated by reference for all purposes.

DESCRIPTION BACKGROUND AND SUMMARY

The invention relates to a method for changing from a coasting or free-rolling mode of a motor vehicle with an internal combustion engine and automatic clutch, which is disengaged during the coasting or free-rolling mode, to a fuel cut-off mode with the clutch engaged, according to the preambles of the independent claims.

In motor vehicles with an internal combustion engine and an automatic clutch, an automatic changeover to coasting mode is known if the driver is not requesting propulsion, i.e. if he is not operating the gas pedal. Coasting is a state in which the drive train is open by automatic disengagement of the clutch and the internal combustion engine continues to run in neutral. As the drag torque of the internal combustion engine is eliminated, fuel can be saved. If the driver operates the vehicle brakes, however, the conventional behavior of motor vehicles without an automatic clutch is preferred, whereby the motor vehicle operates in the fuel cut-off mode.

Fuel cut-off, which is also used for fuel saving, means an interruption of the fuel supply to the internal combustion engine, so that the latter does not output any power, but is only kept running by the inertia of the vehicle, i.e. is pushed by the vehicle with the clutch engaged, wherein the internal combustion engine acts as a brake and the motor vehicle experiences a deceleration because of the drag torque of the internal combustion engine.

A so-called free-rolling mode or Roll-Start/Stop mode (RSS) represents an alternative to a coasting mode, wherein the fuel supply to the internal combustion engine is completely cut off. The drag torque of the internal combustion engine is also eliminated in this case. Both mentioned operating modes, coasting mode and free-rolling mode, are possible with all drive trains, which can be opened automatically in some way. Of course this applies to automatic transmissions (conventional torque converter or dual clutch gearboxes), but also to automatic manual transmissions (AMT), continuous variable transmissions (CVT) and manual gearboxes that are fitted with an automatic clutch, i.e. an electrically or electronically operated clutch. Within the scope of this disclosure, the term coasting mode or free-rolling mode should also include associated phases in which the internal combustion engine is temporarily operated at other revolution rates than the idling revolution rate with the clutch disengaged.

A generic method is also known from DE 102 21 701 A1, whereby the change from coasting or free-rolling mode to fuel cut-off mode takes place relatively smoothly in order to remain almost unnoticed by the driver. However, it should certainly be noticed in this case, as the driver should get feedback about the change of the vehicle state.

The object of the invention is to make a change from coasting or free-rolling mode to fuel cut-off mode more comfortable for the driver.

This object is achieved by a method and by a device with the features of the independent claims. Advantageous developments of the invention are specified in the dependent claims.

The invention is based on the knowledge that there are driving situations in which the driver does not expect feedback about the change from coasting or free-rolling mode to fuel cut-off mode, but is rather disturbed or irritated thereby. This can be prevented by the invention.

Such a driving situation is e.g. that in which a motor vehicle in the coasting or free-rolling mode is travelling behind another motor vehicle that is travelling with fuel cut-off, e.g. because no coasting or free-rolling mode is provided therein. If the driver of the motor vehicle travelling in the coasting or free-rolling mode is expecting e.g. that the vehicle in front will decelerate in a conventional manner when approaching a red light, the coasting or free-rolling mode will not normally be terminated as long as the driver only operates the brake lightly. But if the driver of the vehicle travelling in the coasting or free-rolling mode is surprised by the behaviour of the vehicle travelling in front, he has to operate the brake so strongly that the coasting or free-rolling mode is automatically terminated. In this case it is disturbing for the driver to feel the change to the fuel cut-off mode and to experience the sudden additional braking effect connected therewith.

Another such driving situation is e.g. that in which a motor vehicle in the coasting or free-rolling mode is currently driving down a downhill road. The coasting or free-rolling mode should also be automatically terminated then, but it is irritating for the driver to feel the change to the fuel cut-off mode.

The vehicle electronics that control the operation of the engine, clutch and gearbox are capable of automatically identifying driving situations of both of the above-mentioned types, i.e. those of the first described type in which a braking demand on the part of the driver is detected during the coasting or free-rolling mode, whereby the braking torque of the vehicle brake exceeds the currently available braking torque of the internal combustion engine, and those of the latter described type in conditions that are independent of pedal operations by the driver, e.g. if sensors or navigation devices of the motor vehicle identify that the motor vehicle is currently driving down a downhill road. In both cases, with the invention the increase of the drag torque of the internal combustion engine acting on the motor vehicle during the changeover from coasting or free-rolling mode to fuel cut-off mode is made so slowly and smoothly that the driver does not feel it.

This can be carried out in two ways as required. On the one hand the clutch can be engaged so slowly that the change of vehicle deceleration during the engagement of the clutch does not exceed a preset value. In addition or alternatively, after engagement or partially even during engagement of the clutch, the fuel supply to the internal combustion engine can be reduced so slowly that the change of vehicle deceleration during the changeover does not exceed the preset value.

In this case it can be advantageous for a motor vehicle with a multi-speed transmission for a dedicated preset value to be provided for each gear, which can also be selected from a plurality of preset values depending on the ratio between the braking torque produced by the brakes on the wheels and the maximum drag torque produced by the internal combustion engine.

The time that it takes for the drag torque of the internal combustion engine to increase from zero to one hundred percent during the changeover from coasting or free-rolling mode to fuel cut-off mode without the driver noticing this typically lies in a range of about 1 to 5 seconds.

BRIEF DESCRIPTION OF THE FIGURES

A description of exemplary embodiments using the figures follows. In the figures.

DETAILED DESCRIPTION

In a motor vehicle that is currently in a coasting or free-rolling operating mode, under certain conditions, e.g. if a braking demand by the driver is detected during a coasting or free-rolling mode, whereby the braking torque of the vehicle brake exceeds the currently available braking torque of the internal combustion engine, or if the motor vehicle is currently driving down a downhill road, the coasting or free-rolling mode is automatically terminated in a manner unnoticed by the driver.

For this purpose, on termination of the coasting or free-rolling mode the drag torque of the internal combustion engine is initially fully compensated, so that the drive train does not cause torque on the vehicle wheels. In order to effect this, the vehicle electronics, which control inter alia the operation of the engine, clutch and gearbox, deliver a corresponding quantity of fuel to the internal combustion engine.

Consequently, the compensation of the drag torque is gradually decreased by reducing the quantity of fuel delivered to the internal combustion engine, and that is done so slowly that the change of vehicle deceleration resulting from the increasing drag torque does not exceed a preset value, which is selected such that the change is not normally perceived by the driver.

Figure 1:
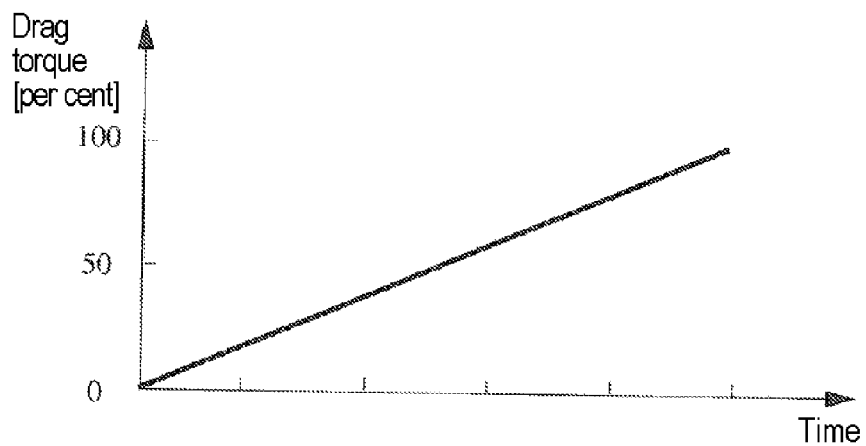
FIG. 1 shows a graph for illustrating the principle of the gradual reduction of the compensation of the drag torque after the termination of a coasting or free-rolling mode.

For this purpose, in the exemplary embodiment the compensation of the drag torque is increased from zero to one hundred percent according to a linear function, as shown in FIG. 1. Because drivers usually continually adapt the position of the pedals to the desired deceleration without always being aware of this, they do not normally notice such a slow transition from coasting or free-rolling mode to fuel cut-off mode.

In one development, the gradual decrease of the compensation of the drag torque can be made dependent on the ratio between the braking torque produced by the brakes on the wheels and the maximum drag torque produced by the internal combustion engine for the currently engaged gear. If the ratio is large, i.e. if the current braking torque is much greater than the maximum drag torque, the gradual decrease of the compensation of the drag torque takes place much faster than if the ratio is approximately equal to 1, which is the usual criterion for a termination of the coasting or free-rolling mode, or if there is no braking torque because the vehicle electronics terminate the coasting or free-rolling mode for reasons other than that the driver operates the brake pedal. Ideally, the decrease of the compensation of the drag torque also takes place depending on the gear, because the drag torque in higher gears is lower and can thus decrease more rapidly than in lower gears without the driver noticing the change.

Figure 2:
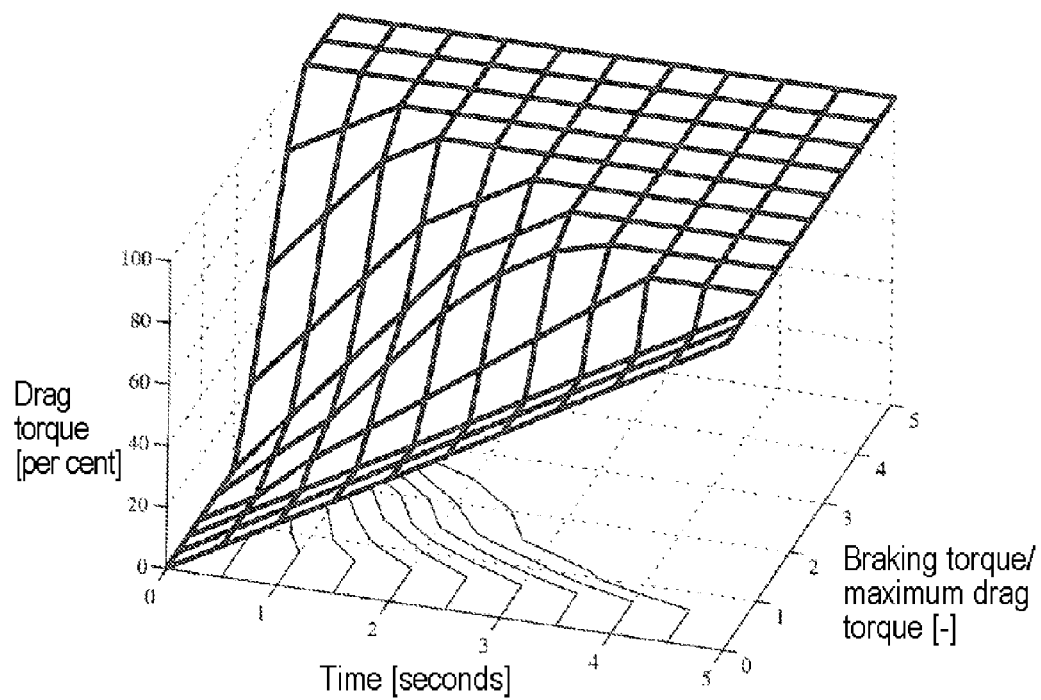
FIG. 2 shows a three-dimensional illustration of an example of a gradual decrease of the compensation of the drag torque following the termination of a coasting or free-rolling mode depending on the ratio between the braking torque produced by brakes and the maximum drag torque produced by the internal combustion engine.

Said development can be implemented with a set of two-dimensional look-up tables, one for each gear. The time profile of the reduction of the compensation of the drag torque following the termination of a coasting or free-rolling mode depending on the ratio between the braking torque produced by the brakes and the maximum drag torque produced by the internal combustion engine that is achieved with such a look-up table is shown in FIG. 2. Therein, the two independent axes represent the time following the termination of the coasting or free-rolling mode and the ratio of the currently acting braking torque to the maximum drag torque. The vertical axis represents the percentage value of the currently effective drag torque. There is a dedicated two-dimensional look-up table as in FIG. 2 for each gear.

For ratios between the braking torque produced by the brakes and the maximum drag torque produced by the internal combustion engine that are less than 1, the decrease of the compensation of the drag torque takes place at its slowest rate, and said time profile is also used if the coasting or free-rolling mode is terminated for reasons other than that the driver operates the brake pedal.

In order to avoid fluctuations of the drag torque if the driver changes the brake pedal position during the reduction of the compensation of the drag torque, either the initial value of the torque ratio can be used for the entire time of the reduction of the drag torque compensation, or the drag torque compensation can take place such that it can only be made slower during the time of its reduction but not faster.

As mentioned, there are cases in which the vehicle electronics terminate a coasting or free-rolling mode even without pedal operations by the driver. This also includes cases in which the driver expects a distinctly noticeable change of vehicle deceleration, i.e. he should notice the onset of the drag torque. Such a case exists, for example, if the driver consciously deactivates the coasting mode by operating a corresponding switch or moving the gear selection lever to a different position than the D (Drive) position. Therefore, for any reason, for a termination of the coasting or free-rolling mode, it is to be individually determined in advance whether this should take place with the described slow change to fuel cut-off mode or not.

The invention claimed is:

1. A method for changing from a coasting mode of a motor vehicle with an internal combustion engine and an automatic clutch, which is disengaged during the coasting mode, to a fuel cut-off mode, in which the clutch is engaged, wherein before engaging the clutch the internal combustion engine is brought to a revolution rate which is within a threshold of a revolution rate in a drive train, comprising:

under one or more predetermined conditions,
reducing a fuel supply to the internal combustion engine to zero following the engagement of the clutch; and
increasing a drag torque of the internal combustion engine acting on the motor vehicle during the changeover from the coasting mode to the fuel cut-off mode where the increasing takes place at a given rate from zero to a maximum available drag torque.

2. The method as claimed in claim 1, wherein
the one or more predetermined conditions comprise that during the coasting mode a braking demand on the part of a driver is detected for which a braking torque of a vehicle brake exceeds a currently available braking torque of the internal combustion engine.

3. The method as claimed in claim 1, wherein
the one or more predetermined conditions comprise at least one condition that is independent of any pedal operations by a driver.

4. The method as claimed in claim 3, wherein
the at least one condition that is independent of any pedal operations includes a condition that the motor vehicle is currently driving down a downhill road.

5. The method as claimed in claim 1, wherein
the clutch is engaged so slowly that a change of vehicle deceleration during the engagement of the clutch does not exceed a preset value.

6. The method as claimed in claim 5, wherein
following engagement of the clutch the fuel supply to the internal combustion engine is reduced so slowly that the change of vehicle deceleration during the changeover from the coasting mode to the fuel cut-off mode does not exceed the preset value.

7. The method as claimed in claim 1, wherein
the given rate is selected depending on a ratio between a braking torque produced by brakes on wheels and the maximum available drag torque produced by the internal combustion engine, the given rate increasing as the ratio increases.

8. The method as claimed in claim 7, wherein the given rate is further selected based on a currently engaged gear, the given rate being higher in higher gears and lower in lower gears.

9. The method as claimed in claim 1, wherein
the drag torque of the internal combustion engine acting on the motor vehicle during the changeover from the coasting mode to the fuel cut-off mode is increased from zero to the maximum available drag torque during a period of time of between 1 and 5 seconds.

10. The method as claimed in claim 1, wherein the drag torque is increased linearly.

11. A method comprising:
responsive to a braking torque being greater than a threshold, increasing a drag torque of an engine at a rate, the drag torque increasing from zero to a maximum available drag torque.

12. The method of claim 11, wherein the rate is selected based on an applied braking torque.

13. The method of claim 12, wherein the rate is increased as the applied braking torque increases.

14. The method of claim 11, wherein the increase in drag torque is achieved by decreasing a fuel injection amount to the engine after completely engaging a clutch.

15. The method of claim 14, wherein the fuel injection amount is decreased to zero.

16. The method of claim 11, wherein the increase in drag torque is affected by a gradual engagement of a clutch from completely disengaged to completely engaged.

17. The method of claim 11, wherein the increase in drag torque is achieved by simultaneously decreasing a fuel injection amount to the engine and increasing a clutch engagement.

18. The method of claim 17,
wherein increasing the drag torque from zero to the maximum available drag torque comprises a transition from a coasting state to a deceleration fuel cut-off state;
wherein the drag torque is increased linearly, the rate comprising a slope of the linear increase;
wherein the rate increases as a ratio of an applied braking torque to the maximum available drag torque increases, the rate being selected so that the increasing of the drag torque is completed in at most 5 seconds; and
wherein, upon completion of the increasing of the drag torque to the maximum available drag torque, a clutch which mechanically couples the engine to a drive wheel is completely engaged and the fuel injection amount is zero.

19. The method of claim 11, wherein the drag torque is increased linearly.

20. The method of claim 11, wherein the maximum available drag torque is achieved when a clutch is fully engaged, the clutch coupling the engine to a drive wheel, and a fuel injection amount is zero.

* * * * *